United States Patent [19]

Morita

[11] Patent Number: 5,204,718
[45] Date of Patent: Apr. 20, 1993

[54] ELECTROPHOTOGRAPHIC PROCESS CONTROL DEVICE WHICH USES FUZZY LOGIC TO CONTROL THE IMAGE DENSITY

[75] Inventor: Tetsuya Morita, Yokohama, Japan
[73] Assignee: Ricoh Company, Ltd., Tokyo, Japan
[21] Appl. No.: 870,086
[22] Filed: Apr. 17, 1992

[30] Foreign Application Priority Data

Apr. 19, 1991 [JP] Japan ................................ 3-088655

[51] Int. Cl.⁵ .......................................... G03G 21/00
[52] U.S. Cl. .................................... 355/246; 355/208; 395/3; 395/22
[58] Field of Search ............... 355/200, 203, 204, 208, 355/246; 364/807; 395/3, 22, 900

[56] References Cited

U.S. PATENT DOCUMENTS

| | | | |
|---|---|---|---|
| 4,236,817 | 12/1980 | Hofstetter | 355/68 |
| 4,305,651 | 12/1981 | Umezawa et al. | 355/219 |
| 4,678,317 | 7/1987 | Grossinger | 355/216 |
| 4,716,540 | 12/1987 | Yamakawa | 395/3 |
| 4,864,490 | 9/1989 | Nomoto et al. | 395/3 X |
| 4,903,051 | 2/1990 | Egawa et al. | 355/246 X |
| 5,025,282 | 6/1991 | Nakamura et al. | 355/38 |
| 5,109,275 | 4/1992 | Naka et al. | 355/326 X |
| 5,121,467 | 6/1992 | Skeirik | 395/11 |

Primary Examiner—A. T. Grimley
Assistant Examiner—Christopher Horgan
Attorney, Agent, or Firm—Oblon, Spivak, McClelland, Maier & Neustadt

[57] ABSTRACT

An electrophotographic process control device for controlling the supply of a toner in such a manner as to stabilize images against changes in the characteristics of a photoconductive element and in the concentration of the toner. An image density sensor measures the density of an image formed on a photoconductive drum. A scanner writes read image data representative of a document on the photoconductive drum. A determining section is responsive to the image density from the image density sensor and write image data from the scanner and representative of the area of an image for executing a predetermined fuzzy combination operation by using fuzzy rules registered beforehand and converts a membership function resulted from the operation to a non-fuzzy value to thereby determine a toner supply manipulation value.

2 Claims, 6 Drawing Sheets

ELECTROPHOTOGRAPHIC PROCESS CONTROL DEVICE WHICH USES FUZZY LOGIC TO CONTROL THE IMAGE DENSITY

BACKGROUND OF THE INVENTION

The present invention relates to a copier, printer, facsimile transceiver or similar equipment for copying or printing an image by an electrophotographic procedure and, more particularly, to an electrophotographic process control device capable of controlling an electrophotographic process on a step basis.

A traditional method of controlling an electrophotographic process consists in measuring the surface potential of a photoconductive drum and the image density, i.e., the amount of toner deposition by an electrometer and a photosensor, respectively, and selecting optimal manipulation amounts matching the respective measured values by referencing a look-up table which is prepared beforehand by experiments. Another conventional method is to change manipulation amounts of various sections of equipment and determine, by a PID (Proportional Integrated Difference) or similar scheme, optimal manipulation amounts while feeding back the resulting states of the equipment sensed by sensors. Still another and more advanced method uses a computing unit implemented with a fuzzy estimation algorithm and manipulates various subjects of control on the basis of the total decision of numerous parameters entangled in a complicated way. Such conventional control methods have various problems left unsolved, as enumerated below.

(1) Causes of the fluctuation of developing ability are too complicated to be presented as a model for control.

(2) Many of the parameters cannot be directly measured, e.g., the charging ability of a toner and the come-off of the coating of a developer as well as the spent condition of a developer.

(3) Since the response of toner supply delays a period of time associated with several copies, the consumption of toner which is continuous and great in amount cannot be readily dealt with.

(4) A huge amount of experimental data is needed in the event of the design and development of a developing unit.

(5) When a reference image pattern is formed to measure the density thereof, the copying speed is lowered and, in addition, the load acting on a cleaning unit is increased.

SUMMARY OF THE INVENTION

It is therefore an object of the present invention to provide an electrophotographic process control device capable of controlling the supply of a toner in such a manner as to stabilize images against changes in the characteristics of a photoconductor and in the concentration of toner.

In accordance with the present invention, an electrophotographic image process control device has an image density sensor for measuring the density of an image formed on a photoconductive drum, a scanner for writing read image data representative of a document on the photoconductive drum, and a determining section responsive to the image density from the image density sensor and write image data from the scanner and representative of the area of an image for executing a predetermined fuzzy combination operation which uses fuzzy rules registered beforehand, and converting a membership function resulted from the operation to a non-fuzzy value to thereby determine a toner supply manipulation value.

Also, in accordance with the present invention, a process control device for electrophotographic apparatus has an image density sensor for measuring the density of an image formed on a photoconductive element, a scanner for writing read image data representative of a document image on the photoconductive element, a neural network responsive to data from sensors including a toner density sensor, a surface electrometer, a drum ammeter, a drum rotation counter, an exposure duration counter, a copy counter, a temperature sensor and a humidity sensor positioned within and in peripheral portions of the electrophotographic equipment for outputting image density data by using image density data from the image density sensor as learning data, and a determining section responsive to the image density data from the neural network and write image data from the scanner for performing a predetermined fuzzy combination operation by using fuzzy rules registered beforehand, and converting a membership function resulted from the operation to a non-fuzzy value to thereby determine a toner supply manipulation value.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
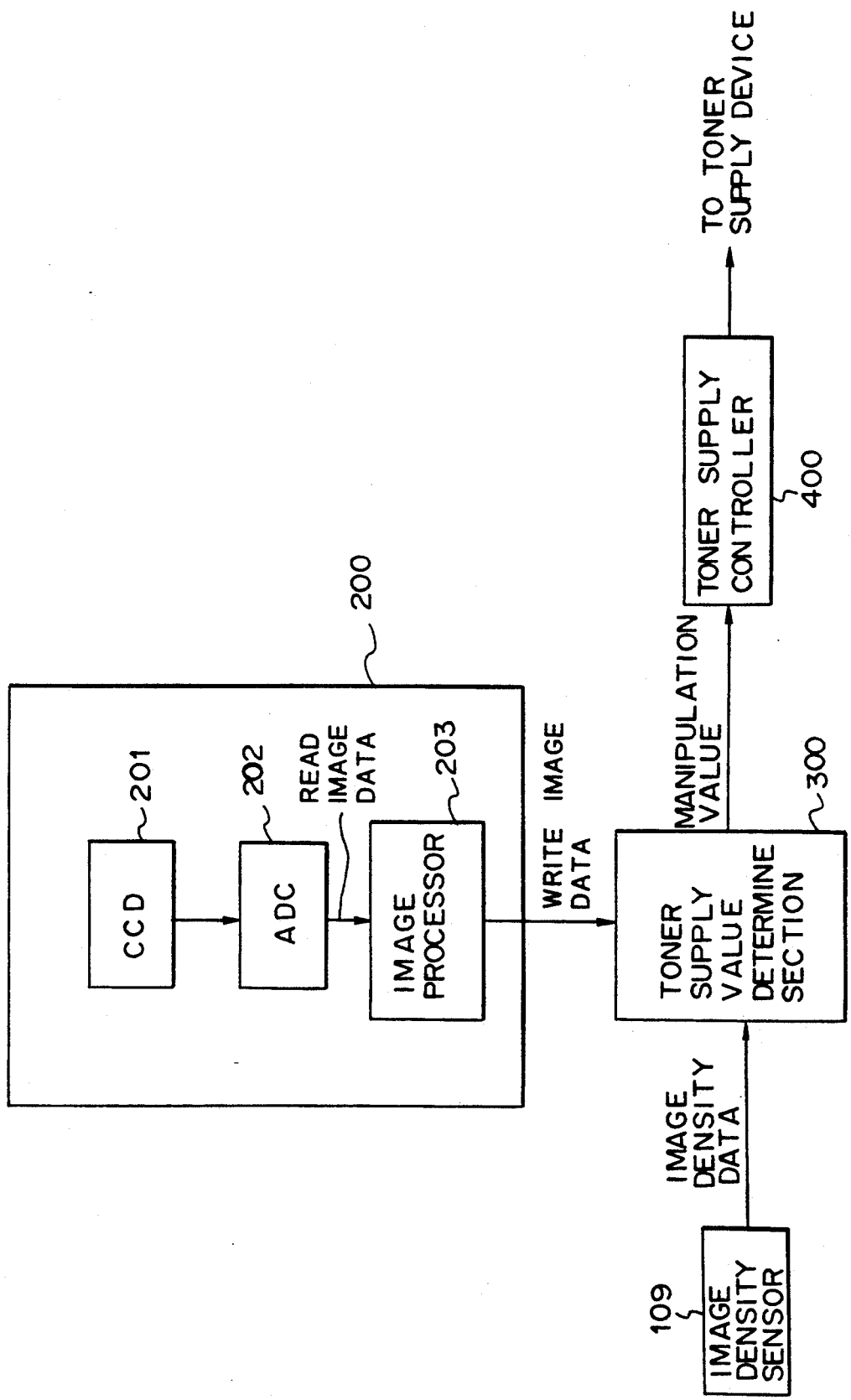
FIG. 1 is a block diagram schematically showing an electrophotographic process control device embodying the present invention.

Referring to FIG. 1 of the drawings, an electrophotographic process control device embodying the present invention has an image density sensor 109 for outputting image density data, a scanner 200 for outputting image data to be written, a toner supply value determining section 300 for determining a toner supply manipulation value, and a toner supply controller 400 for supplying a toner on the basis of the determined manipulation value.

Figure 5:
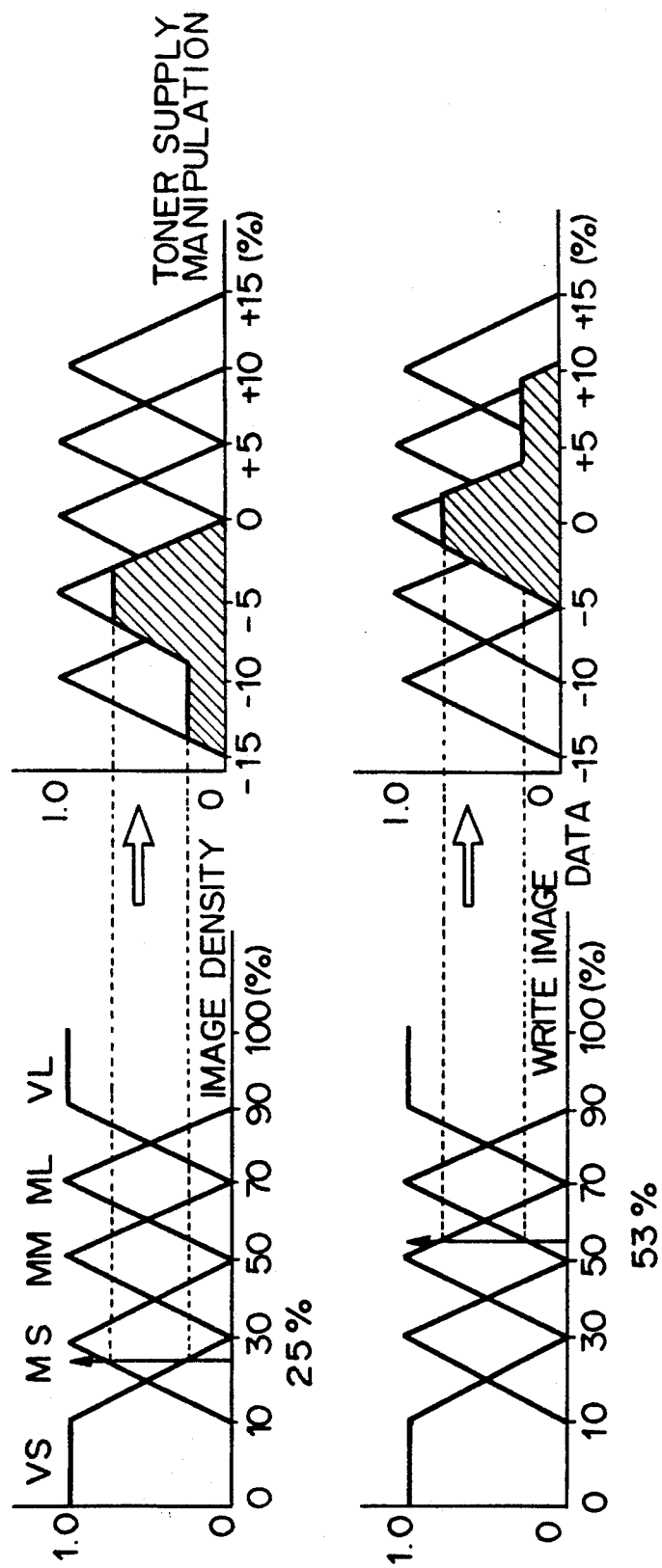
FIG. 5 shows specific fuzzy rules applicable to toner supply control to be executed by the control device of the invention.
Figure 6:
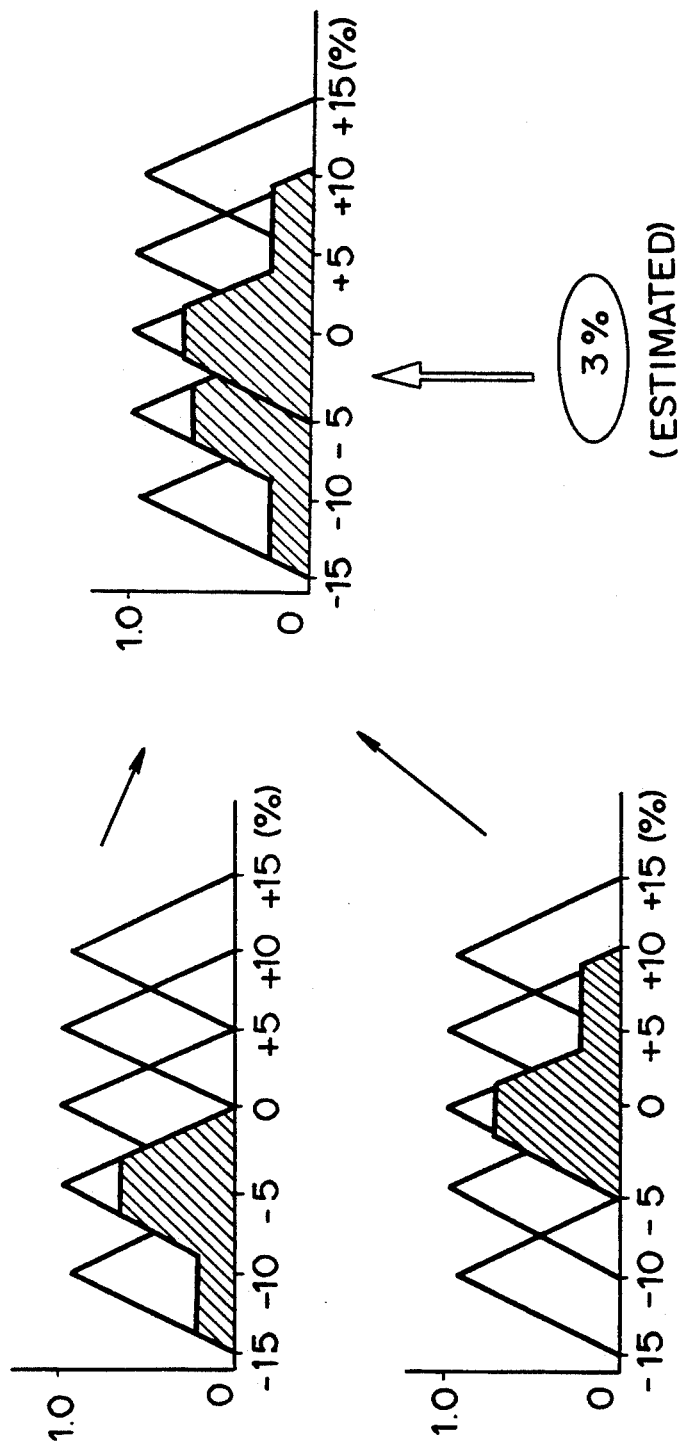
FIG. 6 shows a procedure in which a toner supply manipulation value is detrermined by fuzzy estimation based on fuzzy rules.

In the scanner 200, a document image is read by a CCD (Charge Coupled Device) image sensor 201, then digitized by an analog-to-digital converter (ADC) 202, and then subjected to various kinds of image processing including correction by an image processor 203. The resulting image data from the scanner 200 and the image density data from the image density sensor 109 are applied to the toner supply value determining section 300. In response, the determining section 300 determines a toner supply manipulation value which stabilizes the image density at a predetermined value. For example, assume that the image density level is 25% and the image data to be written is 53%. Then, as shown in FIG. 5, the membership functions (indicated by hatching) of the toner supply manipulation value (posterior) are determined by respective rules. Thereafter, all the membership functions of the posterior are subjected to MAX combination to produce the final membership function indicated by hatching in FIG. 6. The final membership function is converted to a non-fuzzy value to thereby determine a toner supply manipulation value. While some different methods are available for the conversion of the membership function to a non-fuzzy value, one of them is to calculate the center of gravity of the membership function (hatched portion).

To control the supply of a toner in an electrophotographic process, a reference image pattern is formed on a photoconductive element for the measurement of image density. The amount of toner deposition on the reference image pattern is measured by a photosensor, or P sensor as sometimes referred to hereinafter, so that the toner supply is controlled in matching relation to image density which is based on the amount of toner deposition. Generally, the toner supply is effected when the image density is low or interrupted when it is high. Since forming the reference toner image pattern on the photoconductive element lowers the overall copying speed and increases the load of a cleaning unit, the number of times that such a pattern is formed should be as small as possible. However, when the reference pattern is formed and, therefore, image density is measured, for example, every predetermined number of copies for the above purpose, sharp changes in the amount of toner consumption cannot be dealt with immediately, resulting in poor image quality.

Figure 2:
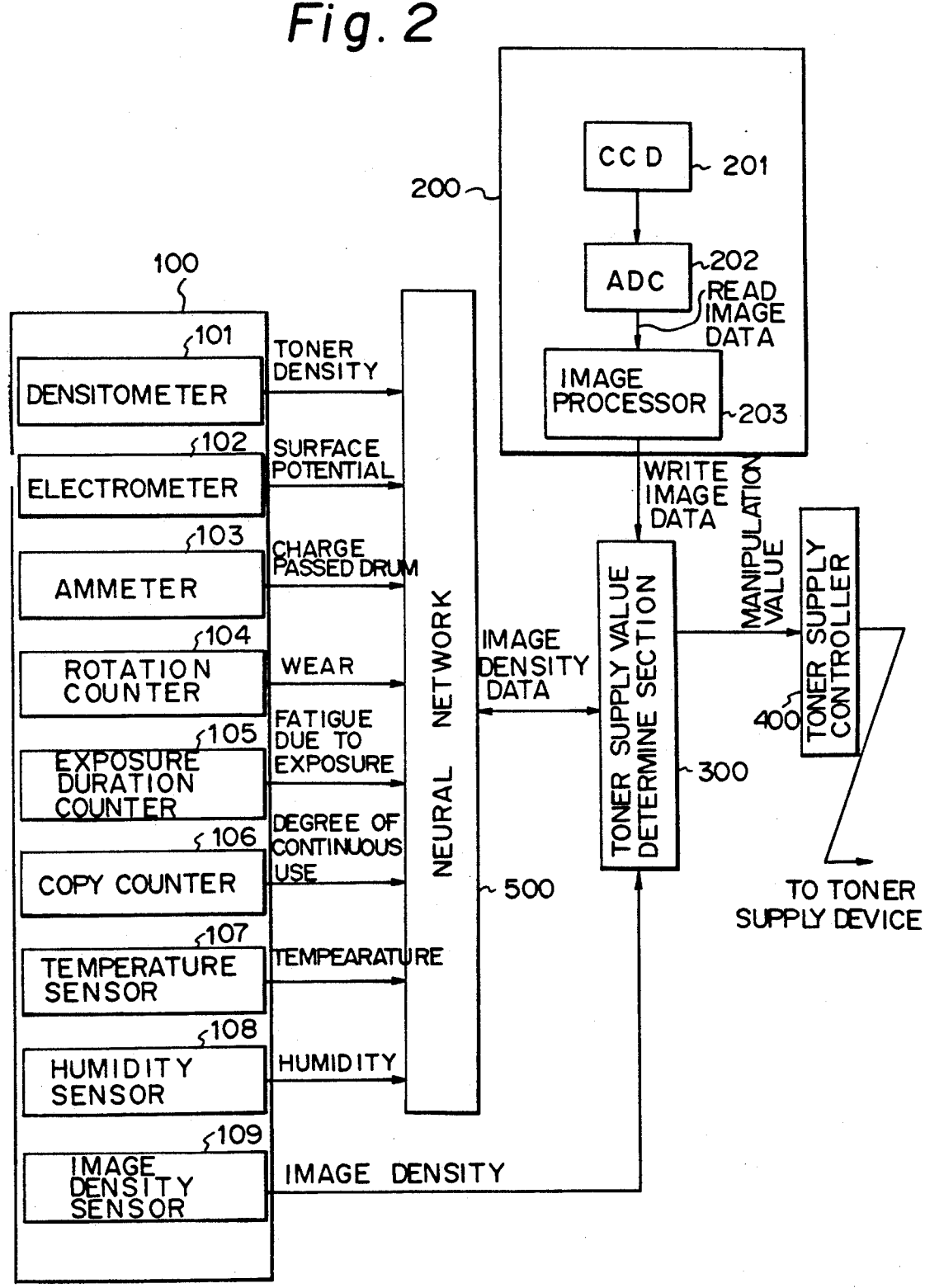
FIG. 2 is a block diagram schematically showing an alternative embodiment of the present invention.
Figure 3:
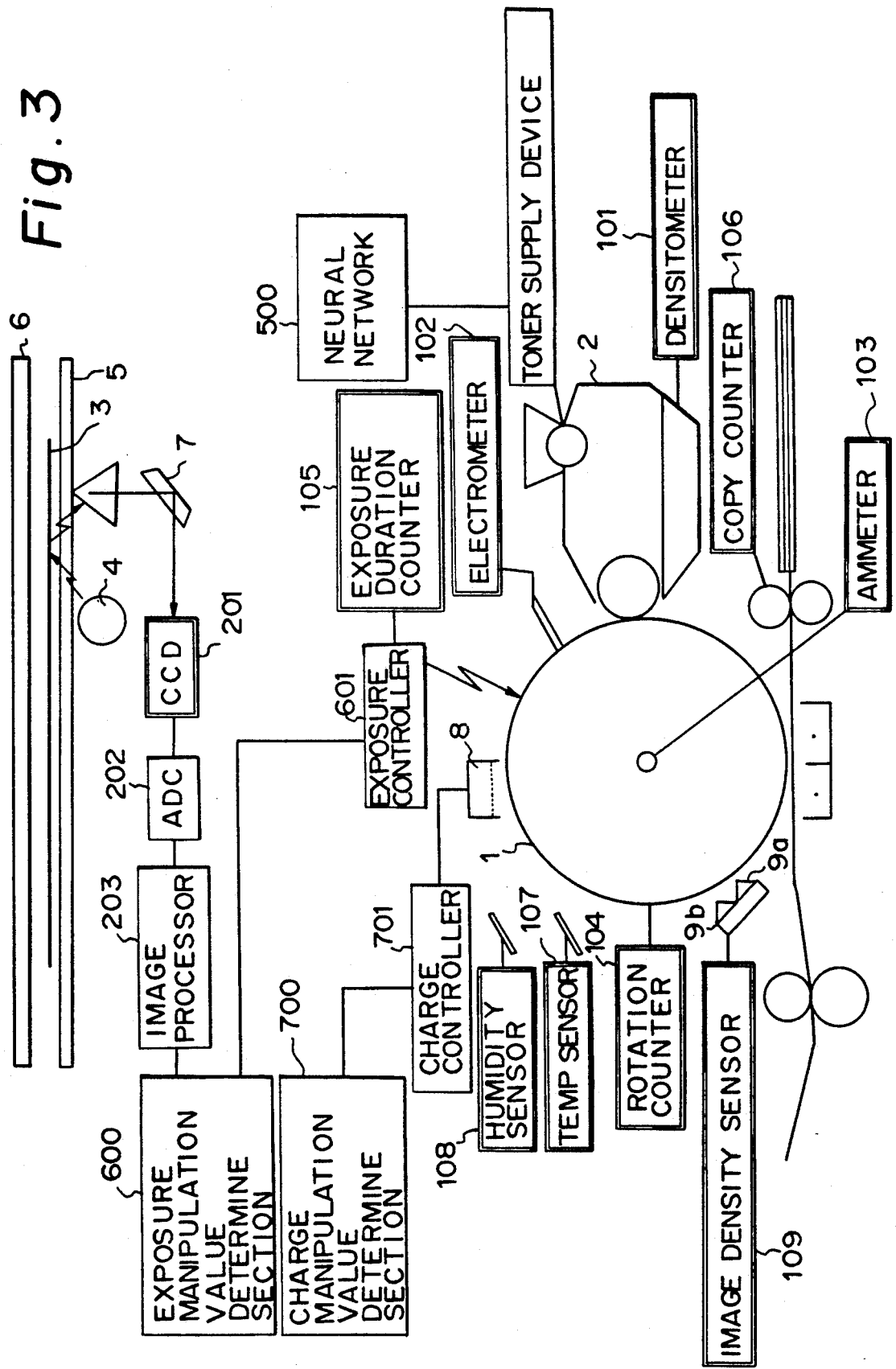
FIG. 3 is an electrophotographic copier to which the present invention is applicable.
Figure 4:
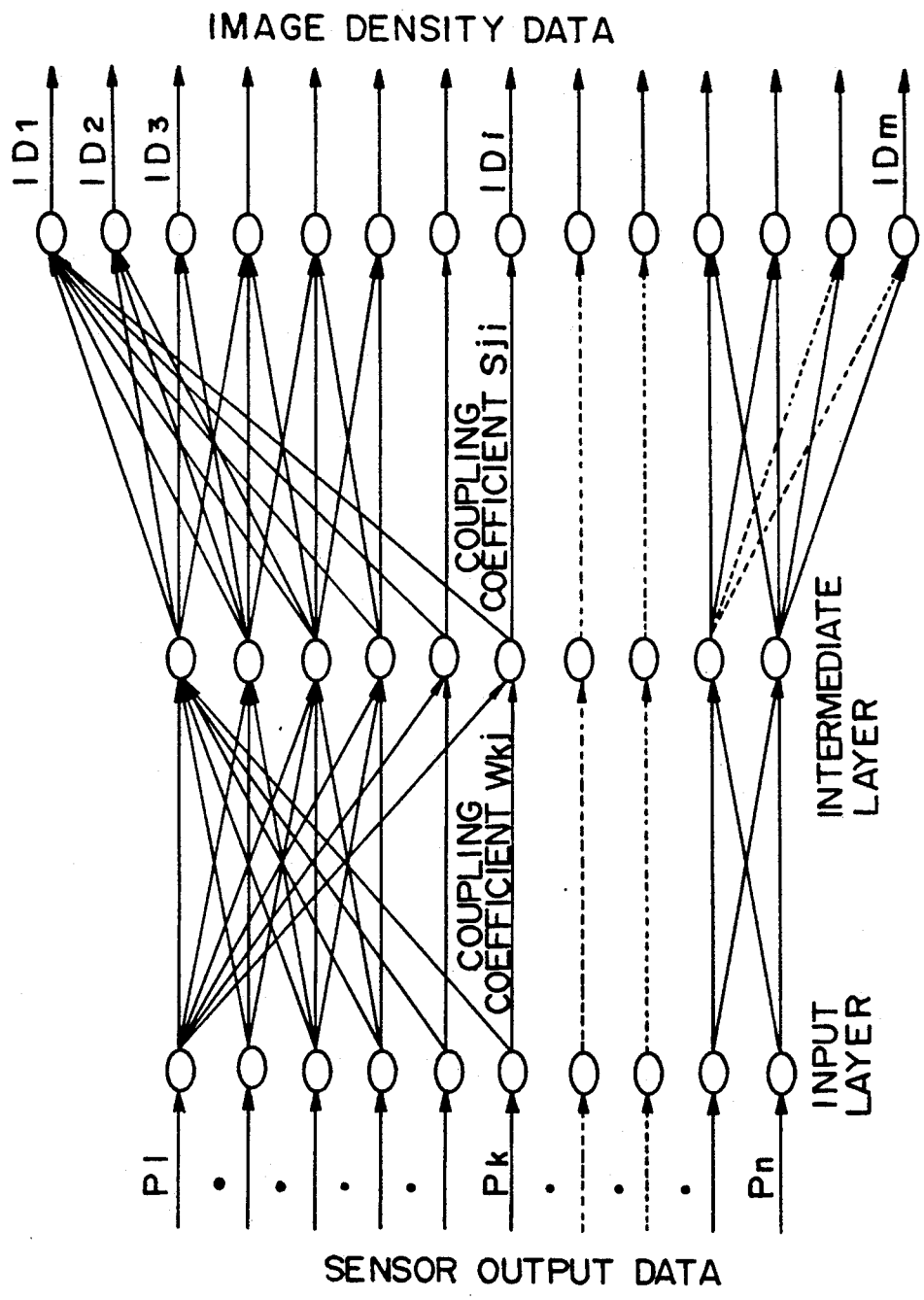
FIG. 4 shows a specific construction of a neural network incorporated in the electrophotographic process control device of the present invention.

FIG. 2 shows an electrophotographic process control device embodying the present invention which eliminates the above-discussed drawbacks. Briefly, the control device of the invention causes a neural network to learn a relation between the various factors effecting image density and the actual image density and thereby controls the toner supply without forming any reference image pattern for measurement. In FIG. 2, the same or similar blocks as the blocks of FIG. 1 are designated by like reference numerals, and redundant description thereof will be avoided for simplicity. As shown in FIG. 2, the control device has sensors 100 for measuring parameters relating to toner consumption, a neural network 500 for determining an image density in response to the outputs of the sensors 100, the scanner 200, the supply value determining section 300, and the toner supply controller 400. As shown in FIGS. 2 and 3, the sensors 100 are comprised of a toner densitometer 101 responsive of toner density, an electrometer 102 responsive to the surface potential of a photoconductive drum 1, a rotation counter 103 for counting the rotations of the drum 1, an exposure duration counter 105, a copy counter 106, a temperature sensor 107, a humidity sensor 108, and the image density sensor 109.

As shown in FIG. 3, a light source, e.g., a halogen lamp 4 illuminates the image surface of a document 3 existing between a glass platen 5 and a cover plate 6. The resulting reflection from the document 3 is read by the CCD image sensor 201 via optical members including mirrors. The output of the CCD image sensor 201 is digitized by the ADC 202, then processed by the image processor 203, and then applied to the exposure manipulation value determining section 500. In response, this section 500 determines a manipulation amount meant for the exposing section and sends it to an exposure controller 601. On the other hand, a charge manipulation value determining section 700 determines a manipulation value meant for the charging section and sends it to a charge controller 701.

The operation of the control device of the invention will be described with respect to the learning stage and the decision stage of the neural network 500.

At a learning stage, the neural network 500 obtains various sensor data from the sensors 100 while a reference pattern for determining image density is formed on the drum 1. Among the sensor output data, parameters effecting the image density are applied to the input layer of the neural network 500. Applied to the output layer of the neural network is the output of the P sensor which is an instruction value or learning data.

The parameters effecting the image density include the concentration of a toner stored in a toner box 2, FIG. 3, the charge potential on the drum 1, the current flow into the drum 1 from a charging section, the wear and fatigue of the drum 1 which influences the long-term deterioration of the drum 1, the degree of continuous use representative of the frequency of operation of the equipment (copier), and the temperature and humidity having influence on the electrostatic capacity of the drum 1 and the frictional charge to be deposited on the toner.

Examples of parameters having influence on the image density and methods of calculating them will be described.

The toner density which is a first parameter is measured, in the case of a two-component type developer, in terms of a weight ratio of the toner in the toner box to the developer by the toner densitometer 101.

The surface potential of the drum 1 which is a second parameter is determined by forming a predetermined latent image pattern on the drum 1 and then measuring the surface potentials of the resulting image area and white background of the drum 1 by the electrometer 102. Here, stabilizing the surface potentials to target values is the object of latent image control. A third parameter is an amount of charge passed through the drum 1 and is determined by measuring a current fed from a charger 8 to the drum 1 by the ammeter 103 and then integrating the currents by the duration of use of the drum 1. Specifically, since the sensitivity of the drum 1 sequentially falls due to the long-term repetition of charging and discharging, the amount of charge passed through the drum 1 is represented by percentage to the usable limit (maximum rating) of the drum 1.

An amount of wear of the drum 1 which is a fourth parameter is substantially proportional to the total number of rotations of the drum 1. Specifically, the surface of the drum 1 is sequentially shaved off in contact with a cleaning section and a blade while in rotation, so that the electrostatic capacity of the drum 1 sequentially decreases. Therefore, the amount of wear of the drum 1 is determined in terms of the count of the rotation counter 104 and is represented by percentage to the usable limit (maximum rating) of the drum 1. An amount of fatigue of the drum 1 which is a fifth parameter is substantially proportional to the total duration of exposure of the drum 1. Specifically, the sensitivity of the drum 1 also changes and decreases due to short-term repetition of exposure. Hence, the amount of fatigue is determined in terms of the count of the exposure duration counter 105 and is represented by percentage to the usable limit (maximum rating) of the drum 1.

A degree of continuous use which is a sixth parameter shows how many copies have been produced in the past up to the present time by, for example, a copier. The degree of continuous use means a ratio of a short-term duration of use of, for example, a copier and a duration of suspension. Further, as the drum 1 is continuously used, the sensitivity thereof falls and potentials undesirably remain thereon. In light of this, the degree of continuous use is determined in terms of the count of the copy counter 106. Temperature and humidity which are a seventh and an eighth parameter are represented by the outputs of temperature sensor 107 and humidity sensor 108, respectively. The sensitivity of the drum 1 is extremely susceptible to changes in temperature and humidity. While this is ascribable to changes in the electrostatic capacity of a photoconductor and leakage currents occurring during and after charging, it is difficult to grasp a direct relation in practice.

Regarding the image density which is a ninth parameter, use is made of the image density sensor 109 which may be implemented as a P sensor made up of a laser diode 9a and a photosensor 9b. The amount of toner deposition on the image area of the drum 1 is calculated in response to the output of the image density sensor 109 and on the basis of a difference of reflectances. The output of the image density sensor 109 is used as learning data by the neural network and is also used as data for determining an amount of toner supply by the toner supply value determining section 300. The prerequisite is that the toner supply value determining section 300 be adjusted beforehand in such a manner as to output an optimal toner supply manipulation value in response to the image density. The adjustment of this determining section may be executed in parallel with the operation for obtaining the learning data for the neural network 500.

To measure, among the above various parameters, the image density, a predetermined reference image pattern has to be formed on the drum 1. This lowers the copying speed of, for example, a copier and increases the load on a cleaning unit, as stated earlier. Hence, the number of times that such a reference pattern is formed should be as small as possible.

In light of the above, when the control device of the present invention executes control, the reference image pattern for measurement is formed every time more than a predetermined copies are produced and, therefore, a minimum number of times. Stated another way, the image density is not measured until a predetermined number of copies have been produced. For this reason, the control device of the invention causes the neural network 500 to estimate an image density at any suitable time and controls the toner supply in matching relation to the estimated image density. Specifically, the process control device of the invention is capable of feeding a toner in an optimal amount copy by copy by obtaining charge potential, drum current and other sensor data copy by copy and combining them with the image data from the scanner to estimate image density data.

In summary, it will be seen that the present invention provides an electrophotographic process control device capable of effecting optimal control with respect to each of various definite factors which cause a photoconductive element to deteriorate. Such a control device, therefore, achieves a broad range of control and prevents equipment in which it is incorporated from running out of control. Since the control device estimates image density without forming a reference density pattern on a photoconductive element, it prevents the copying speed from being lowered and reduces the load on a cleaning unit. Moreover, the control device makes it needless to assume a model for the control of a developing system, immediately adapts itself to sharp changes in the amount of toner consumption, and reduces the amount of experiments and, therefore, the term and costs for design and development.

Various modifications will become possible for those skilled in the art after receiving the teachings of the present disclosure without departing from the scope thereof.

What is claimed is:

1. An electrophotographic image process control device comprising:
    means for periodically forming a reference image pattern on a photoconductive drum;
    an image density sensor for measuring a density of an image formed on the photoconductive drum based on sensing the reference image pattern;
    a scanner for writing read image data representative of a document on said photoconductive drum; and
    determining means responsive to the image density from said image density sensor and write image data from said scanner for executing a predetermined fuzzy combination operation which uses fuzzy rules registered beforehand, and converting a membership function resulting from said operation to a non-fuzzy value to thereby estimate image density between times when the reference image pattern is periodically formed and to determine a toner supply manipulation value.

2. A process control device for electrophotographic apparatus, comprising:
    means for periodically forming a reference image pattern on a photoconductive drum;
    an image density sensor for measuring a density of an image formed on the photoconductive element;
    a scanner for writing read image data representative of a document image on said photoconductive element;
    a neural network responsive to data from sensors including a toner density sensor, a surface electrometer, a drum ammeter, a drum rotation counter, an exposure duration counter, a copy counter, a temperature sensor and a humidity sensor positioned within and in peripheral portions of said electrophotographic equipment for outputting image density data by using image density data from said image density sensor as learning data; and
    determining means responsive to the image density data from said neural network and write image data from said scanner for performing a predetermined fuzzy combination operation by using fuzzy rules registered beforehand, and converting a membership function resulted from said operation to a non-fuzzy value to thereby estimate image density between times when the reference image pattern is periodically formed and to determine a toner supply manipulation value.

* * * * *